(12) United States Patent
Park et al.

(10) Patent No.: US 11,715,849 B2
(45) Date of Patent: Aug. 1, 2023

(54) METHODS FOR CATHODE RECYCLING OF END-OF-LIFE LITHIUM BATTERIES

(71) Applicant: Alliance for Sustainable Energy, LLC, Golden, CO (US)

(72) Inventors: Kyusung Park, Greenwood Village, CO (US); Anthony Keiran Burrell, Golden, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 223 days.

(21) Appl. No.: 17/087,468

(22) Filed: Nov. 2, 2020

(65) Prior Publication Data

US 2021/0226273 A1 Jul. 22, 2021

Related U.S. Application Data

(60) Provisional application No. 62/929,546, filed on Nov. 1, 2019.

(51) Int. Cl.
| | |
|---|---|
| *H01M 4/505* | (2010.01) |
| *H01M 4/525* | (2010.01) |
| *H01M 10/54* | (2006.01) |
| *H01M 10/0525* | (2010.01) |
| *H01M 4/62* | (2006.01) |
| *H01M 10/42* | (2006.01) |
| *H01M 4/38* | (2006.01) |
| *B01D 11/02* | (2006.01) |

(52) U.S. Cl.
CPC ......... *H01M 10/54* (2013.01); *B01D 11/0203* (2013.01); *H01M 4/382* (2013.01); *H01M 4/505* (2013.01); *H01M 4/525* (2013.01); *H01M 4/622* (2013.01); *H01M 10/0525* (2013.01); *H01M 10/4242* (2013.01); *H01M 10/4285* (2013.01)

(58) Field of Classification Search
CPC .. H01M 10/54; H01M 4/622; H01M 10/0525; H01M 10/4285; B01D 11/0203
See application file for complete search history.

(56) References Cited

U.S. PATENT DOCUMENTS

| | | | | |
|---|---|---|---|---|
| 5,540,741 | A | 7/1996 | Gozdz et al. | |
| 6,308,532 | B1 * | 10/2001 | Hopewell | F25J 3/0238 62/620 |
| 2011/0017528 | A1 | 1/2011 | Kumar et al. | |
| 2013/0211055 | A1 * | 8/2013 | Raines | C07C 323/25 549/21 |
| 2016/0372802 | A1 | 12/2016 | Chiang et al. | |

(Continued)

FOREIGN PATENT DOCUMENTS

CN 108199105 A * 6/2018 ............. C22B 23/04

OTHER PUBLICATIONS

Kabi, S., Ghosh, A. Tunneling conductivity in lithiated transition metal oxide cathode Li0.9[Ni1/3Mn1/3Co1/3]O1.95 . Eur. Phys. J. B 79, 377-381 (2011). https://doi.org/10.1140/epjb/e2010-10773-8 (Year: 2011).*

(Continued)

*Primary Examiner* — Cynthia H Kelly
*Assistant Examiner* — Tarik J Phillip
(74) *Attorney, Agent, or Firm* — Sam J. Barkley

(57) ABSTRACT

Disclosed herein are improved methods and devices for recycling lithium cathodes from batteries using a Soxhlet extractor.

18 Claims, 10 Drawing Sheets

(56) References Cited

U.S. PATENT DOCUMENTS

2018/0254480 A1* 9/2018 Kamo ............... H01M 10/0525
2019/0165419 A1 5/2019 Moriishi

OTHER PUBLICATIONS

Machine translation of CN 108199105 originally published to H et al, on Jun. 2018 (Year: 2018).*
Iang Sun, Keqiang Qiu, Vacuum pyrolysis and hydrometallurgical process for the recovery of valuable metals from spent lithium-ion batteries, Journal of Hazardous Materials, vol. 194, (Year: 2011).*
Aptel, A. and Clifton, M., "Ultrafiltration," Laboratoire de Genie Chimique (CNRS L.A. 192), in Synthetic Membranes; Science, Engineering and Applications, P. M. Bungay, K. H. Londsdale, and M. N. de Pinho, Eds., D. Reidel, Dordrecht, 1986, 57 pages.
Bottino, A. et al., "Solubility Parameters of Poly(vinylidene fluoride)," Wiley Journal of Polymeer Science: Part B: Polymer Physics, vol. 26, 1988, 10 pages.
Chen, M. et al., "Recycling End-of-Life Electric Vehicle Lithium-Ion Batteries," Joule, Oct. 2019, https://doi.org/10.1016/j.joule.2019.09.014, 25 pages.
Dai, Q. et al., "EverBatt: A Closed-loop Battery Recycling Cost and Environmental Impacts Model," Argonne National Laboratory, Energy Systems Division, ANL-19/16, Apr. 2019, 88 pages.
Gao, X. et al., "Promoting solution phase discharge in Li-O2 batteries containing weakly solvating electrolyte solutions," Nature Materials, vol. 15, Aug. 2016, 9 pages.
Han, C. et al., "Organic quinones towards advanced electrochemical energy storage: recent advances and challenges," Journal of Materials Chemistry A, vol. 7, 2019, 38 pages.
Harper, G. et al., "Recycling lithium-ion batteries from electric vehicles," Nature, vol. 575, 2019 12 pages.
Marshall, J. et al., "Disassembly of Li Ion Cells-Characterization and Safety Considerations of a Recycling Scheme," Metals, vol. 10, No. 773, 2020, doi:10.3390/met10060773, 21 pages.
Miao, L. et al., "The structure-electrochemical proper relationship of quinone electrodes for lithium-ion batteries," RSC Phys. Chem. Chem. Phys, vol. 20, 2018, 7 pages.
Shi, Y. et al., "Ambient-Pressure Relithiation of Degraded LixNi0.5Co0.2Mn0.3O2 (0<x<1) via Eutectic Solutions for Direct Regeneration of Lithium-Ion Battery Cathodes," Advanced Energy Materials, vol. 9, 2019, 9 pages.
Wang, T. et al., "Direct Recycling of Spent NCM Cathodes through Ionothermal Lithiation," Advanced Energy Materials, vol. 10, 2020, 6 pages.
Yang, T. et al., "An Effective Relithiation Process for Recycling Lithium-Ion Battery Cathode Materials," Advanced Sustainable Systems, vol. 4, 2020, 6 pages.
Zheng, P., "The Design and Optimization of a Lithium-ion Battery Direct Recycling Process," https://vtechworks.lib.vt.edu/handle/10919/93212, Aug. 21, 2019, 2 pages.

* cited by examiner

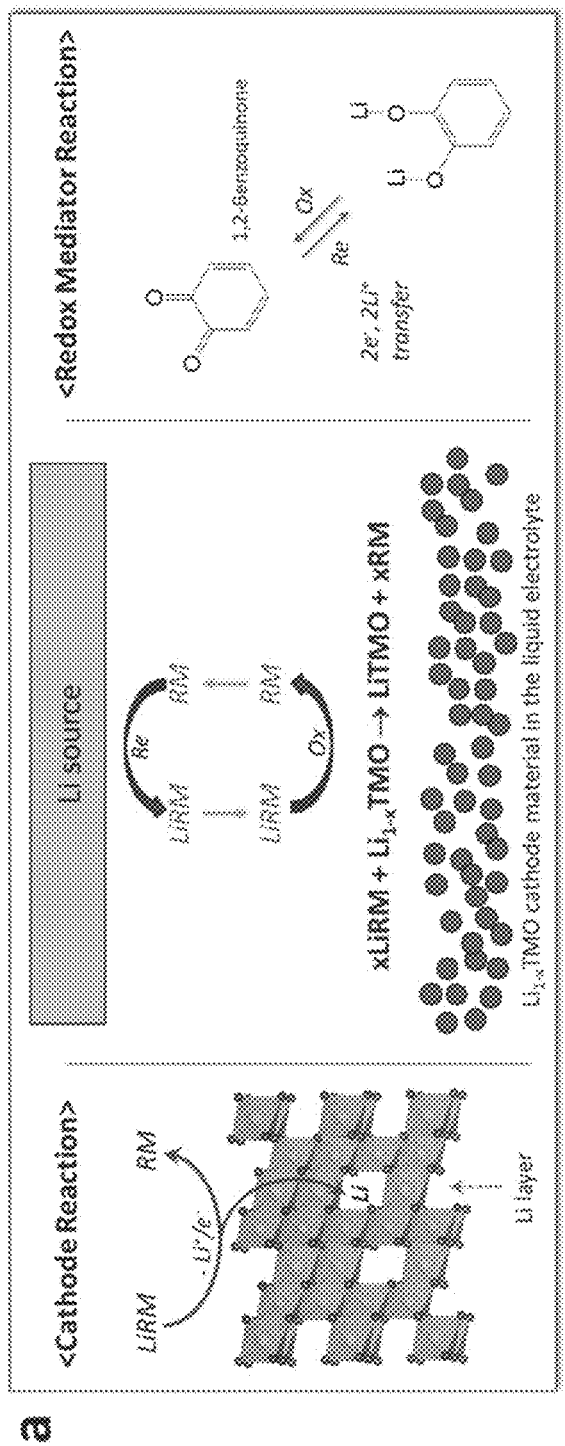
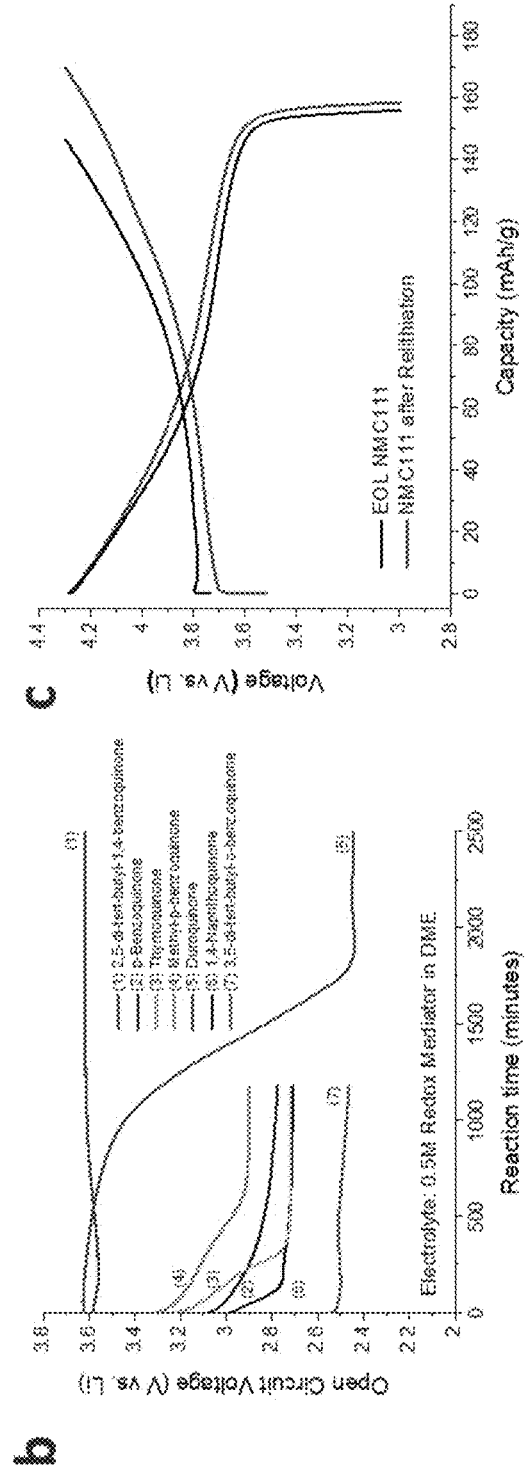
FIGs. 1a, 1b, 1c

METHODS FOR CATHODE RECYCLING OF END-OF-LIFE LITHIUM BATTERIES

CROSS-REFERENCE TO RELATED APPLICATION

This application claims priority under 35 U.S.C. § 119 to U.S. provisional patent application No. 62/929,546 filed on 1 Nov. 2020, the contents of which are hereby incorporated in their entirety.

CONTRACTUAL ORIGIN

The United States Government has rights in this invention under Contract No. DE-AC36-08GO28308 between the United States Department of Energy and Alliance for Sustainable Energy, LLC, the Manager and Operator of the National Renewable Energy Laboratory.

BACKGROUND

It is expected that there will be a lot of end-of-life lithium ion battery wastes from consumer electronics, electric vehicles, and large-scale energy storage systems. It is urgent to find a promising method to recycle the batteries, especially the cathode materials as the cathode materials have the highest materials cost and engineering values in the battery.

While electric vehicles (EVs) help reduce greenhouse gas emissions, their use also poses several critical concerns. Since the battery cathode is made of some critical and key elements such as cobalt, nickel, manganese, and lithium, shortage of those elements and disruption of the supply chain will be a major concern for mass production. Furthermore, the EV battery packs will generate a significant amount of waste stream after their end-of-life (EOL). The direct cathode recycling tries to address these challenges by recycling and reusing EOL cathode materials. For example, electrochemical method, eutectic molten salt method, and ionothermal method have been proposed to relithiate EOL cathode materials. No high throughput room-temperature powder process currently exists to meet the future direct cathode recycling demands.

Traditional approaches to cathode recycling at the end of life for batteries containing lithium ions is focused primarily on extracting the expensive cobalt element by dissolving the cathode materials in an acid bath. However, this is a very cost and energy intensive process and through its implementation the cathode loses its physical properties including its shape, size, and structure.

There are several current approaches to recycling lithium cathodes in batteries at their end-of-life. The efforts are directed towards putting lithium ions back into the crystal structure include putting some lithium sources and the spent battery cathode together and heating up to get final materials, but this method is very simple but needs exact lithium vacancy concentrations, which is almost impossible. Using a hydrothermal method which has a very limited scalability, and which is almost impossible to be adopted in the industry. Using a high temperature molten salt bath. This process is also energy and cost intensive.

The electrodes in Li-ion batteries have polymer binders to combine active materials and conductive carbon additives. However, when it comes to recycle end-of-life (EOL) battery electrode, it is necessary to remove and/or separate the polymer binder from the electrode to recycle electrode active materials. For example, PVDF is widely and exclusively used as a cathode binder. If PVDF exists during a high-temperature cathode recycling process, it decomposes and leaves fluorinated chemical species such as LiF. Here, the problem is twofold. First, pyrolysis of PVDF leaves various toxic gases including hydrogen fluoride (HF). The toxic HF must be trapped during the thermal decomposition step to minimize environmental impacts. Second, not all PVDF decomposition products evaporate. Some fluorinated carbon residues react with the cathode at a high temperature and form surface films such as LiF and $Li_2CO_3$. Since the carbon and fluorine react with lithium atoms in the cathode, it reduces Li inventories of the cathode material and also induces local structural and compositional changes of the near-surface region. Moreover, the presence of thick LiF and $Li_2CO_3$ films impedes Li-ion transfer at the surface during charge/discharge of a battery. Therefore, it is required to remove the PVDF binder, but not at an elevated temperature.

One way to remove PVDF from the EOL cathode at a low temperature is to use a solvent to dissolve PVDF from the cathode composite. Some known solvents for PVDF are tetramethylurea (TMU), trimethylphosphate (TMP), triethylphosphate (TEP), dimethylacetamide (DMA), N-methyl-2-pynolidone (NMP), hexamethylphosphoramide (HMPA), dimethylformamide (DMF), and dimethylsulfoxide (DMSO). They are good solvents for PVDF, but one issue is that they all have high boiling points (b.p.) higher than 150° C. For example, NMP is exclusively used in the Li-ion battery industry to coat cathode with PVDF. However, it requires very high energy and cost to remove NMP after coating owning to its high b.p. (202° C.). NMP is also toxic, so the recovery should be well regulated. Therefore, the removal of PVDF from the EOL cathode with a solvent would also increase the recycling cost. To reduce the cost, first, the use of PVDF solvent should be minimized, and second, the solvent should be also recovered and reused.

SUMMARY

Exemplary embodiments of the invention disclosed herein provide devices and methods that improve the recycling of lithium and other chemicals and elements of interest from batteries. In an aspect disclosed herein is a method for recycling lithium cathodes from batteries comprising using a redox mediator. In an embodiment, disclosed herein is a method for recycling lithium from battery cathodes. In an embodiment, a Soxhlet extractor is used to remove PVDF binder during the recycling process.

Other objects, advantages, and novel features of the present invention will become apparent from the following detailed description of the invention when considered in conjunction with the accompanying drawings.

BRIEF DESCRIPTION OF THE DRAWINGS

FIGS. 1a, 1b, and 1c depict an embodiment of redox-mediator-assisted relithiation of the end-of-life cathode. FIG. 1a depicts Li-deficient end-of-life transition-metal-oxide (TMO) cathode material is relithiated via redox mediator shuttling. FIG. 1b depicts open circuit voltage changes of the half cells with various 0.5M redox mediators in DME electrolyte. FIG. 1c depicts initial charge/discharge voltage curves of the EOL cathode before and after the relithiation.

FIG. 2a depicts initial charge/discharge voltage curves of the relithiated cathode with X M DTBQ (X=0.1, 0.2, 0.3, and 0.5) in DME for 1 hour. FIG. 2b depicts initial charge/discharge voltage curves of the relithiated cathode with 0.5M DTBQ in DME for 10, 30, and 60 minutes. FIG. 2c depicts (003) X-ray diffraction peaks of the relithiated cathode with 0.5M DTBQ in DME for 10, 30, and 60 minutes. FIG. 2d depicts the first-charge-capacity contour plot with electrolyte concentration and reaction time variations. FIG. 2e depicts charge/discharge voltage curves of a full cell with the relithiated cathode (1 hour in the 0.5M DTBQ in DME) and $Li_4Ti_5O_{12}$ anode. FIG. 2f depicts a powder SEM image of the relithiated cathode (1 hour in the 0.5M DTBQ in DME).

FIG. 3a, depicts images of the 0.5M DTBQ in DME electrolyte with lithium inside and the Li metal after the relithiation reaction. FIG. 3b depicts FTIR spectra of a pure DME solvent and the 0.5M DTBQ in DME electrolyte before and after exposure to lithium. FIG. 3c depicts C 1s and Li 1s XPS spectra of the Li metal before and after the relithiation reaction.

DETAILED DESCRIPTION

Figures 2A, 2B, 2C, 2D, 2E, 2F:
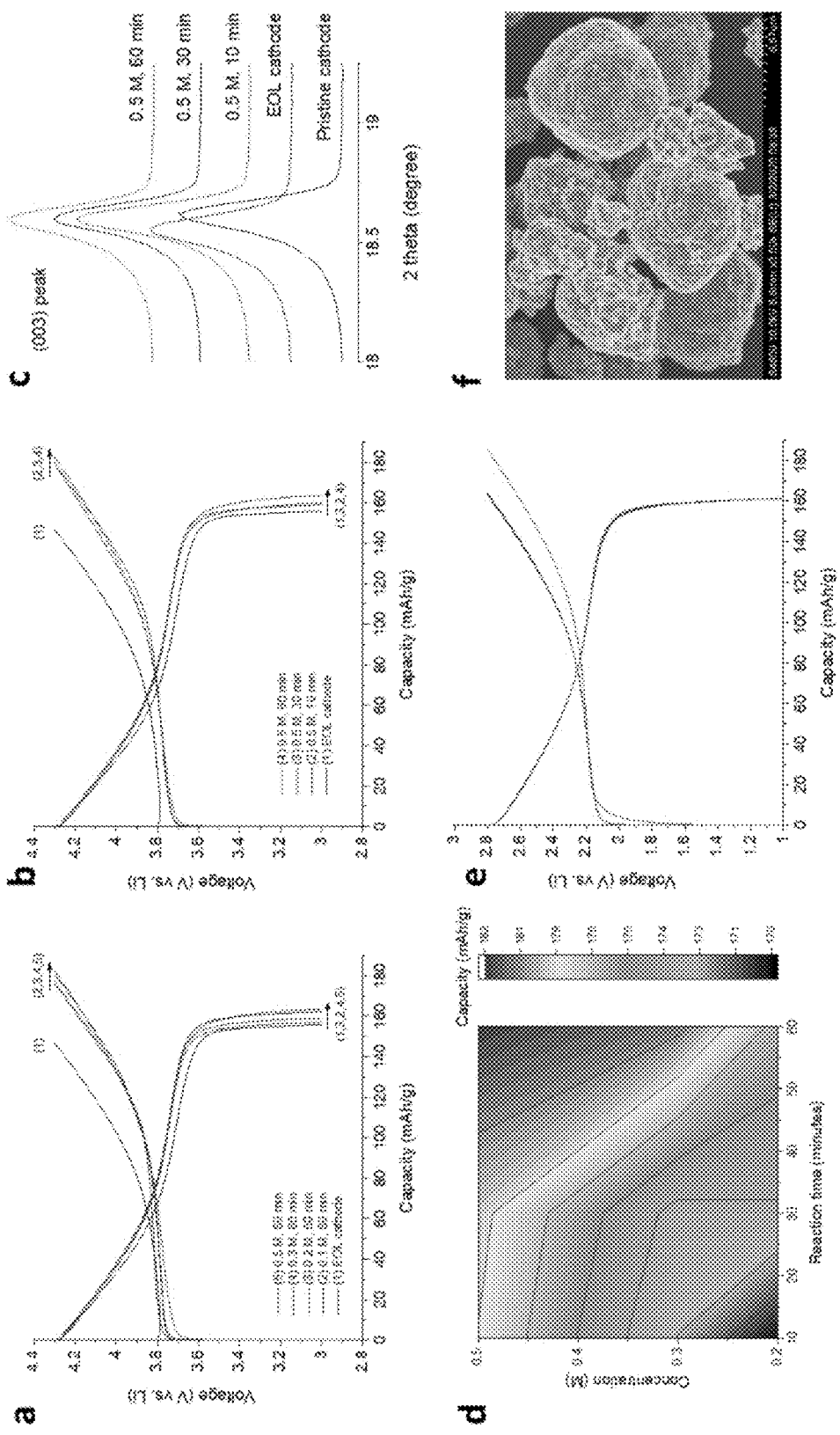
FIGS. 2a, 2b, 2c, 2d, 2e, and 2f depict impacts of process conditions on the relithiation of the end-of-life cathode using compositions and methods disclosed herein.

Increased electric vehicle adoption portends an unprecedented amount of lithium-ion battery wastes in the near future. Since the cathode materials have the highest economic and engineering values, it is essential to recycle and reuse the end-of-life (EOL) cathode materials. The direct cathode recycling approach is distinguished from the traditional transition metal recovery efforts via energy-intensive pyrometallurgy and hydrometallurgy where the engineering value of the cathode cannot be preserved. Key characteristics of the aged cathode materials are loss of the lithium inventory, presence of the cathode-electrolyte interphase film, and mechanical degradation of the secondary particles. It is required to develop a direct cathode recycling method to resolve all these critical technical issues.

Disclosed herein are scalable powder relithiation processes. It was discovered that redox mediators can relithiate EOL cathode powder efficiently at room temperature. It was also discovered that redox mediators can deliver lithium ions and electrons from a lithium source (e.g. Li metal) to the cathode, efficiently relithiate the end-of-life cathode materials and be made ready for second use. In an embodiment, disclosed herein are quinone-based redox mediators, especially 3,5-di-tert-butyl-o-benzoquinone (DTBQ) that shuttle the charges very fast between Li metal and EOL cathode. Reduction of DTBQ on lithium is evidenced by chemistry changes of Li metal and DTBQ, and successful relithiation of EOL cathode by the subsequent oxidation of DTBQ is verified with electrochemical and structural evaluations.

Redox mediators and methods of use are disclosed herein that enable autonomous room-temperature relithiation processes without external process controls. Using low-cost alternatives to DTBQ, the redox mediators and methods disclosed herein are faster, and more reversible than previously available methods and compositions. If the redox mediator cost could be lowered to $100/kg, then recycled cathode (e.g. $LiNi_{1/3}Co_{1/3}Mn_{1/3}O_2$) is cheaper than $10/kg. Moreover, excellent chemical stability of redox mediators is the key to reuse the redox mediator for multiple batch reactions and to lower total recycling cost.

Disclosed herein are novel methods of recycling lithium cathodes that utilize lithium insertion in an efficient way (cost, time, energy perspectives). In an embodiment, disclosed herein is a method for recycling cathode materials from the end-of-life rechargeable lithium batteries. A critical component of cathode recycling is to fill lithium ions back to the crystal structure efficiently because the cathode materials (the lithium source in the battery cell) lose lithium ions by irreversible side reactions over time. Using methods disclosed herein, the initial lithium vacancy concentrations aren't a concern because the voltage is controlled by choosing the right redox mediators. In an embodiment, the method is a room temperature process, so there is no need to increase temperature and pressure, which save energy and money. The reactors can be designed to be a continuous process or a large-scale batch process.

In an embodiment, as disclosed herein, the redox mediators deliver lithium ions and electrons from the anode (e.g. Li metal) to the cathode materials with lithium vacancies. The cathode materials take the lithium-ions/electrons and fill the lithium vacancies. The redox mediators diffuse back to the anode and bring the lithium to the cathode, acting like charge shuttles. Advantages of methods disclosed herein include that it is an autonomous process, so no need to control any electrochemical parameters. In an embodiment, another advantage is that the selection of redox mediators will decide the cell voltage, shuttling kinetics, and materials stability, there are abundant choices of available redox mediators. In an embodiment, another advantage is that the process generates very little waste. In an embodiment, another advantage is that the process doesn't produce another waste stream for recycling. In an embodiment, another advantage is that the process is very easy to scale up.

Relithiation with Redox Mediators

As depicted in FIG. 1a and summarized in the equations 1 and 2, the redox mediators are reversible charge shuttles in an electrochemical cell and deliver Li-ions and electrons from the anode (e.g. Li metal) to the cathode materials with Li deficiencies. The anode as a Li source is not limited to the Li metal but can be any lithiated anode materials. For example, commercial graphite ($Li_xC_6$) and high-energy-density Si anode ($Li_xSi_y$) in the EOL batteries can be used as the Li source and recycled. The reduced redox mediators by the anode are then oxidized at the cathode surface, transferring $Li^+/e^-$ to form fully lithiated cathode. The electrochemical potential of a given redox mediator will determine the lithiation voltage, so that the degree of Li deficiency of the starting EOL cathode is not needed to design and proceed the reaction. The selection of redox mediators will also govern shuttling kinetics and materials stability at the interface. Here, we have tested non-transition-metal-based organic redox mediators, especially quinone-based small molecules. Quinone families typically have redox potentials at 2-3 V vs. $Li/Li^+$ that are ideal for full discharge of cathode materials and do not leave any transition-metal and halide contaminations on the cathode materials.

Anode reaction: RM+Li→Li . . . RM   Equation 1

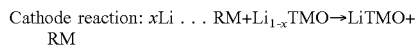

Cathode reaction: $xLi$ . . . $RM+Li_{1-x}TMO→LiTMO+RM$   Equation 2

Where RM is a redox mediator, LiTMO is a lithiated transition metal oxide cathode.

In an embodiment, electrochemical cells with EOL cathode and Li metal anode were tested. The open-circuit voltage (OCV) was monitored at room temperature without any external current as shown in FIG. 1b. All the redox mediators have lowered the cell OCVs to their equilibrium voltages, but the voltage transition time directly depends on the type of redox mediators. 3,5-di-tert-butyl-o-benzoquinone (DTBQ) lowers the cell OCV instantaneously to the equilibrium value whereas duroquinone takes longer than a day. The kinetic difference is because of not only diffusion of the redox mediators in the electrolyte but also formation of the solid-electrolyte interphase (SEI) film at the electrode surface. To verify relithiation of EOL cathode, the cathode was collected and tested in a half cell (Methods). FIG. 1c shows initial charge/discharge voltage curves of EOL cathode and the relithiated cathode with DTBQ. The EOL cathode exhibits 146 mAh/g during charge (Li extraction) because of the Li deficiency, but after the relithiation, the cathode shows 171 mAh/g. The result demonstrates that redox mediators shuttle between Li source and EOL cathode and enable the relithiation.

Powder Relithiation Process

The next step is to develop a scalable relithiation process with EOL cathode powder since EOL cathode is available as a black mass form. Here, the upstream processes have separated the EOL cathode for relithiation. The EOL cathode powder was agitated in a redox-mediator electrolyte with the Li metal that was covered with a porous polypropylene membrane to prevent any direct contact. The porous membrane allows facile diffusion of the redox mediator molecules through it but blocks the crossover of the cathode materials and Li source. DTBQ was examined in the powder process because it effectively relithiates the EOL cathode during a short period of time and has a good chemical stability against lithium.

Control experiments were performed by changing DTBQ concentrations and reaction time. DTBQ was dissolved in DME, and the resulting concentrations are 0.1, 0.2, 0.3, and 0.5M. With each electrolyte, the EOL cathode powder was relithiated for 10, 30, and 60 minutes at room temperature. After the reaction, the cathode powder was collected and washed with fresh DME solvent. Then, the powder was annealed at 850° C. for 4 h. The post heat-treatment is beneficial to restore microstructure of secondary particles because mechanical cracking is a serious material issue in the aged cathode powder. The redox mediator, quinone molecules only have light elements (C, H, O) that are fully evaporated during the annealing and do not leave residues on the cathode powder.

FIG. 2a shows the first-cycle charge/discharge voltage curves of the cathode samples after the 1-hour reaction with 0.1, 0.2, 0.3, and 0.5M DTBQ electrolytes. The EOL cathode shows the highest overvoltage during charge and the lowest charging capacity of 146.5 mAh/g. As the redox mediator concentration increases, the overvoltage decreases and the charging capacity increases. The cathode powder relithiated with the 0.5M DTBQ electrolyte shows the lowest overvoltage and the highest charging capacity of 182.5 mAh/g, which is comparable to the pristine cathode material. The higher overvoltage values from the lower concentration batches are probably due to a minor structural disorder induced by Li vacancies during the post annealing.

The effect of the relithiation reaction time on the electrochemical properties was also tested. The DTBQ concentration was set to 0.5M, and the time was changed to 10, 30, and 60 minutes. A longer reaction time of 1 hour delivers the highest capacity, but a shorter reaction time of 10 minutes also looks promising for full relithiation as its initial charging capacity is 179.1 mAh/g. The degree of relithiation is also evidenced by the (003) X-ray diffraction peak shift that represents the changes in the interslab distance of a layered structure. Compared to the pristine cathode, (003) peak of the EOL cathode shifts to a lower angle as shown in FIG. 2c, which means a higher interslab distance according to the Bragg law. The electrostatic repulsion between oxide ions across the slabs in the presence of Li vacancies is responsible for this change. However, after relithiation, the (003) peaks clearly shift back to the original position, which is a strong evidence of the elimination of Li vacancies. The whole concentration and reaction time matrix, and FIG. 2d, shows the first-charge-capacity contour plot of the relithiated cathode materials. It indicates that the degree of relithiation (i.e. the first-charge capacity) is proportional to the examined reaction parameters (the redox-mediator concentration and the reaction time). With a concentrated electrolyte, the reaction time can be lowered to achieve a target relithiation, and a high throughput process can be achieved. Although a dilute electrolyte may increase the reaction time, it lowers the material cost at the same time. Therefore, the reaction parameters can be determined based on the materials and processing cost analysis.

FIG. 2e shows charge/discharge voltage curves of a full cell with the relithiated cathode (1 hour in the 0.5M DTBQ in DME) and $Li_4Ti_5O_{12}$ anode. The initial charge capacity is 185.2 mAh/g, and the discharge capacity is 161.2 mAh/g. The values are consistent with the half cell data, and it eliminates any ambiguities in the verification of the relithiation concept arising from the Li metal anode in the half cell format. Moreover, the cathode powder after the relithiation exhibits well-preserved secondary particles in FIG. 2f, which reflects a gentle reaction condition of this relithiation process.

Relithiation Mechanism

Figures 3A, 3B, 3C:
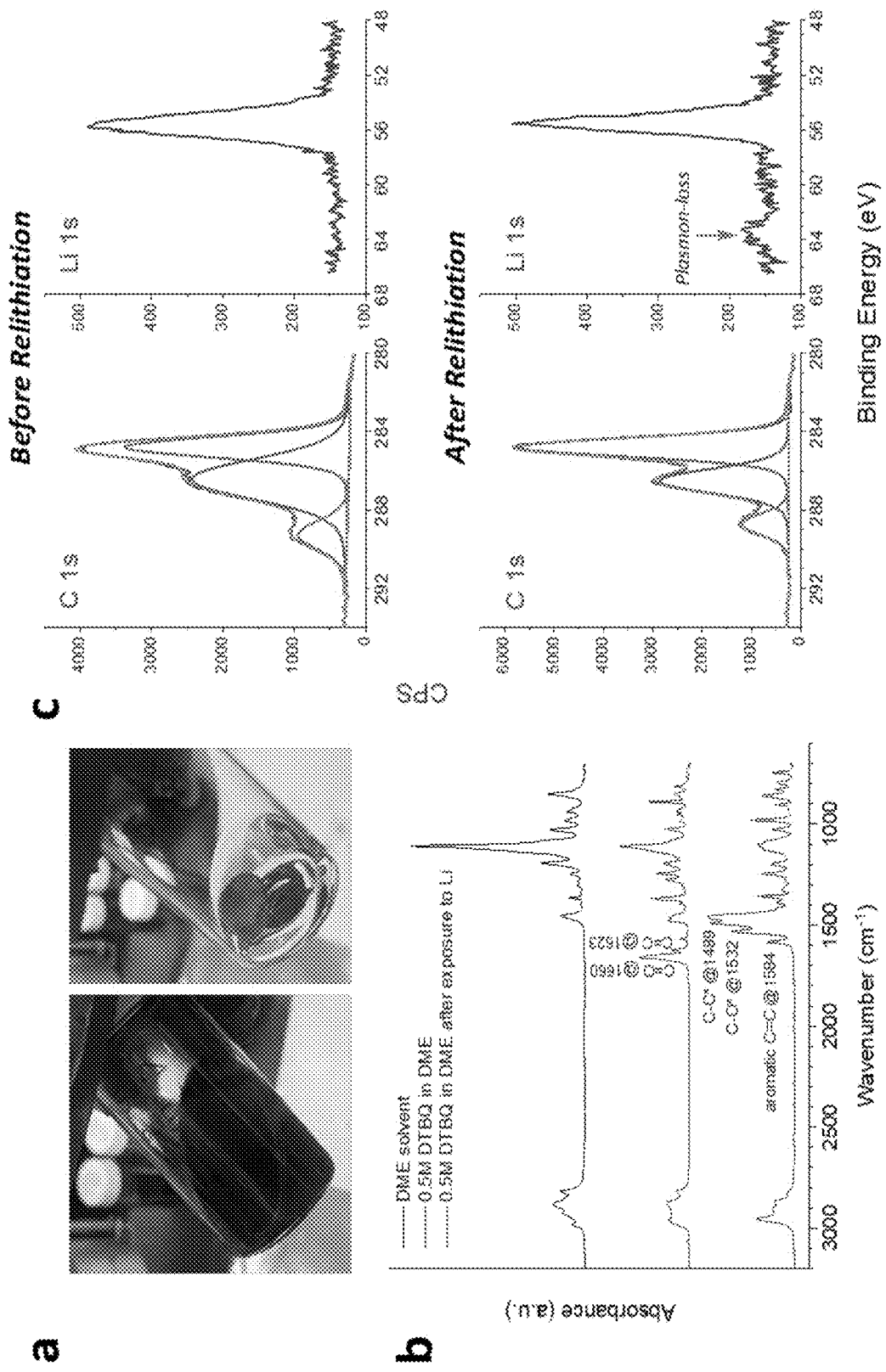
FIGS. 3a, 3b and 3c depict a reaction mechanism behind the redox-mediator-assisted relithiation.
Figure 4:
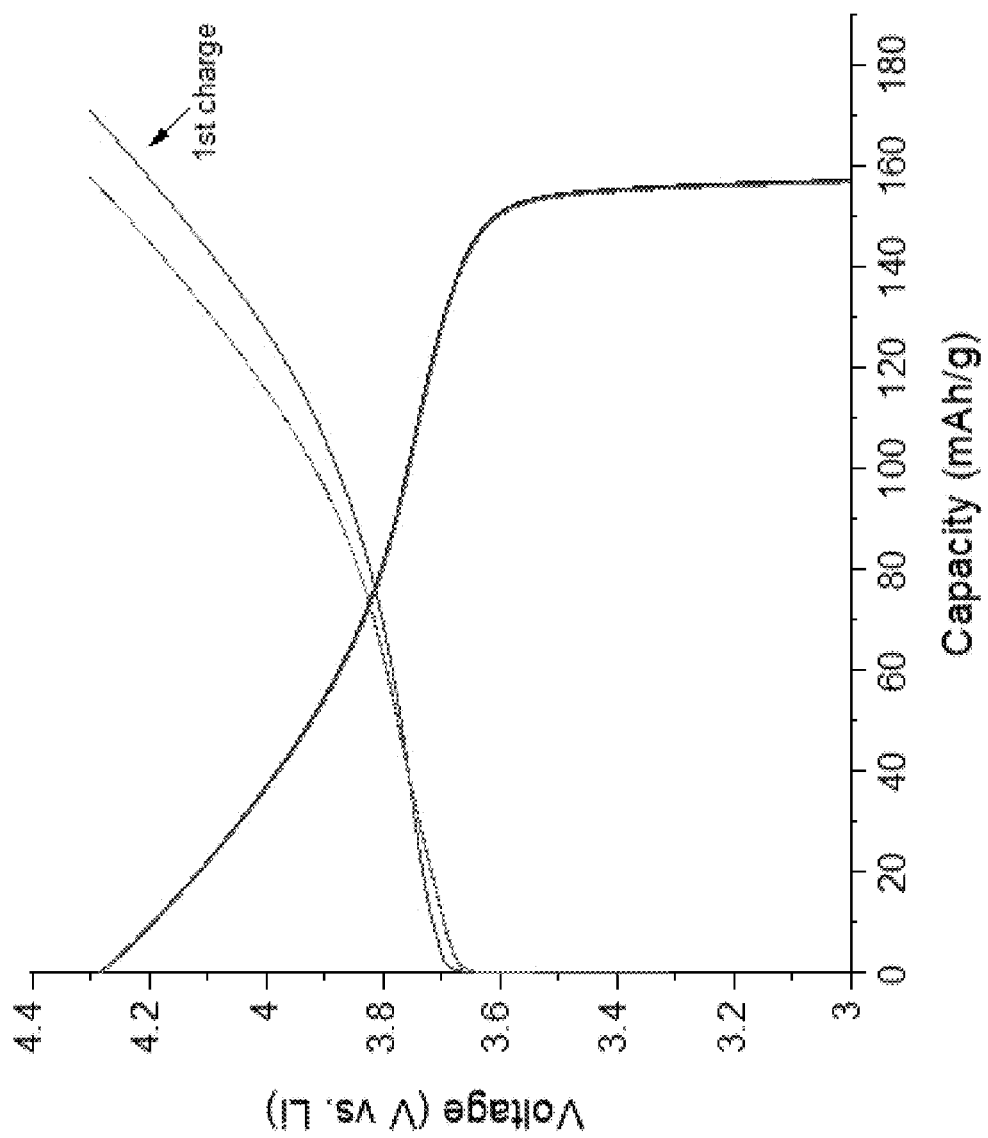
FIG. 4 depicts the charge/discharge voltage curves of the relithiated EOL cathode by the 0.5M DTBQ in DME electrolyte. The relithiation was done in a coin cell as shown in FIG. 1b. The relithiaed EOL cathode was collected and rinsed. A new coin half-cell was assembled to test electrochemistry of the cathode. The cell was cycled four times at 3.0-4.3V vs. Li/Li$^+$ window with C/10 current density.

To understand the chemical process behind this redox-mediator-assisted relithiation, Fourier transform infrared spectroscopy (FTIR) testing was conducted on the electrolyte and X-ray photoelectron spectroscopy (XPS) test on the Li metal. First, FTIR analysis demonstrates reduction of DTBQ by lithium. The color of DTBQ electrolyte is dark yellow after full dissolution, but it changes to dark blue after contact with lithium as shown in FIG. 3a. FTIR spectra of pure DME and the corresponding DTBQ electrolytes before and after contact with lithium are shown in FIG. 3b. The signatures of C=O and C=C bonds of DTBQ are well observed at 1660 and 1623 cm$^{-1}$, respectively. However, after the color change to blue, those peaks disappear, and C—O* and C—C* radical peaks as well as aromatic C=C peak show up. The radical peaks appear due to the coordination of oxygen atoms by Li ions, and the aromatic C=C peak originates from the reduction of quinones. The results indicate the reduction of DTBQ by $Li^+/e^-$ at the Li surface.

XPS analysis demonstrates the dissolution of lithium by DTBQ shown in FIGS. 3a and 3c show C 1s and Li 1s XPS spectra of the lithium foil before and after a relithiation reaction. In both cases, the color of DTBQ electrolyte is dark blue. The C 1s peaks were deconvoluted into three subpeaks of C—C (284.8 eV), C—O (about 286 eV), and O—C=O (about 289 eV). Two changes after the relithiation are (1) the O—C=O peak shift to a lower binding energy and (2) smaller intensity and full width at half maximum (FWHM) values of the C—O and O—C=O peaks. The O—C=O peaks shift from 289.27 to 288.73 eV. The FWHM of the C—O peak decreased from 2.42 to 1.45 eV. The relative intensities of the C—O and O—C=O peaks compared to the C—C peak are decreased from 72.3 and 28.0 to 50.1 and 21.0%, respectively. The results suggest that the reaction cleaned the Li metal so that a less amount of solid-electrolyte interphase (SEI) film is observed. Moreover, after the reaction, the Li 1s XPS spectrum shows a distinct plasmon-loss feature at about 64 eV that is associated with pure metallic Li with a limited SEI coverage. The XPS results confirm that the reduction of DTBQ takes lithium from the Li surface and leaves bare Li surface with minimal SEI, which further evidences the proposed reaction mechanism in FIG. 1a and equation 1.

Table 1 shows the first-cycle charge/discharge capacities of the cathode samples. Pristine $Li[NiMnCo]_{1/3}O_2$ shows 184 mAh/g during charge, but the EOL cathode, $Li_{0.9}[NiMnCo]_{1/3}O_2$ only exhibits 146 mAh/g because of the Li deficiency. After the relithiation reaction with redox mediators, the charge capacities of all the samples have increased and are higher than that of the EOL cathode, which means that the redox mediator delivers lithium from the Li source to the EOL cathode.

Table 1 depicts the first-cycle charge/discharge capacities of the relithiated cathode by various redox mediators as shown in FIG. 1. The pristine and EOL cathode results are listed as reference.

TABLE 1

| Cathode | Redox mediator electrolyte | First charge capacity (mAh/g) | First discharge capacity (mAh/g) |
| --- | --- | --- | --- |
| $Li[NiMnCo]_{1/3}O_2$ | — | 184 | 162 |
| $Li_{0.9}[NiMnCo]_{1/3}O_2$ | — | 146 | 156 |
| Relithiated EOL cathode | 0.5M p-Benzoquinone in DME | 149 | 151 |
| | 0.5M Thymoquinone in DME | 159 | 149 |
| | 0.5M Methyl-p-benzoquinone in DME | 163 | 153 |
| | 0.5M Duroquinone in DME | 176 | 159 |
| | 0.5M 1,4-Naphthoquinone in DME | 161 | 148 |
| | 0.5M 3,5-di-tert-butyl-o-benzoquinone in DME | 171 | 157 |

Another point is that DTBQ and duroquinone efficiently relithiate the cathode, and the initial charge capacities are higher than 170 mAh/g. The different capacities with redox mediators are due to differences in charge transfer kinetics, the diffusion of redox mediators in the electrolyte, and the electrochemical stability at the electrode interface. For example, some redox mediators (e.g. 2,5-di-tert-butyl-1,4-benzoquinone) form thick solid-electrolyte interphase (SEI) films on the Li anode and exhibit poor electrochemical properties. Some redox mediators (e.g. p-Benzoquinone) leaves residue on the cathode after the reaction, which increases cell overvoltage during charging.

In another embodiment, methods disclosed herein are for the electrochemical relithiation which include a first step of forming an electrode with the end-of-life batteries, and a second step of making a battery cell, and third step of applying a current so that the cathode receives lithium ions from the counter electrode (=Li metal).

Table 2 shows an embodiment of the various properties and measurements of the performance of DBBQo.

TABLE 2

| Capacity | DBBQo in DME | Chem Delith | Pristine |
| --- | --- | --- | --- |
| 1st C cap (mAh/g) | 175 | 146 | 184 |
| 1st D Cap (mAh/g) | 160 | 156 | 162 |
| 1st Cycle Eff (%) | 91.8 | 106.4 | 88 |
| Reversible C Cap (mAh/g) | 161 | 159 | 163 |
| Reversible D Cap (mAh/g) | 160 | 157 | 162 |
| Irreversible Cap Loss (mAh/g) | 14 | −10 | 21.4 |
| Irreversible Cap Loss (%) | 8.2 | −7.0 | 11.6 |

After the RM reaction, the electrode was rinsed and put into a new coin cell w/DBBQo electrolyte (no RM).

The quinones tested in this work are p-benzoquinone (reagent grade, ≥98%), thymoquinone (≥98%), methyl-p-benzoquinone (≥98%), duroquinone (≥97%), 1,4-naphthoquinone (≥97%), 1,2-naphthoquinone (≥97%), 2-methoxy-1,4-naphthoquinone (≥98%), 2,5-di-tert-butyl-1,4-benzoquinone (≥99%), and 3,5-di-tert-butyl-o-benzoquinone (DTBQ, ≥98%). All the chemicals were purchased from Sigma-Aldrich and used without further purification.

In addition to the information depicted in FIG. 1b, the 2,5-di-tert-butyl-1,4-benzoquinone forms a thick yellow SEI film on the Li metal, which is why there was no OCV change in FIG. 1b. The resulting cathode did not have any relithiation. DTBQ is stable against the Li metal, and the Li metal does not show a notable color change or passivation. The surface chemistry of the Li metal was further characterized with XPS (see FIG. 3c), and the results confirm that DTBQ is stable against lithium. This is a reason why the DTBQ electrolyte induced the instantaneous OCV drop of a half cell. In an embodiment, thymoquinone reacts with the Li metal and forms uneven SEI films.

In an embodiment, pieces of Li metal foil were sealed inside the bag that is made of Celgard separator and the Li metals were reacted for 10, 30, and 60 minutes of relithiation reaction with 0.5M DTBQ in DME electrolyte. The Li metals were taken out of the Li bag after the reaction and rinsed with pure DME solvent for analysis.

For the relithiation of the EOL cathode powder, it is useful to prepare a redox-mediator electrolyte. To design control experiments, the electrolyte was chemically reduced with lithium first so that the reduced electrolyte starts the relithiation reaction as soon as the EOL cathode powder is added. Dark yellow color was observed from the 0.5M DTBQ electrolyte. However, once it reacts with the Li metal, it turns to dark blue. The Li metal also shows pitting corrosion on the surface. The degree of the pitting corrosion appears to be proportional to the electrolyte concentration and storage time. The bare Li metal strips were added only to reduce DTBQ and removed from the DTBQ electrolyte before the relithiation reaction.

Figure 5:
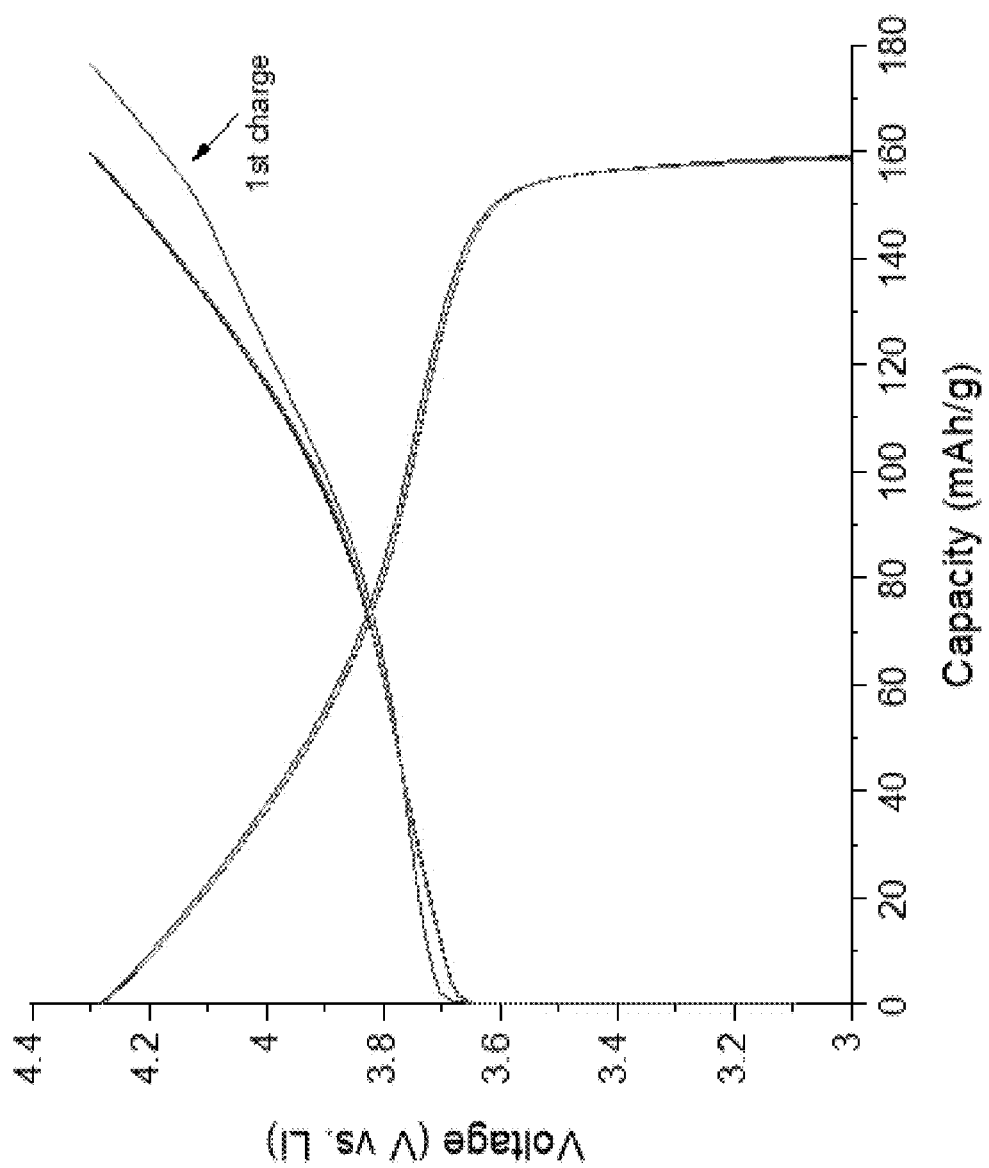
FIG. 5 depicts the charge/discharge voltage curves of the relithiated EOL cathode by the 0.5M Duroquinone in DME electrolyte. The relithiation was done in a coin cell as shown in FIG. 1b. The relithiaed EOL cathode was collected and rinsed. A new coin half-cell was assembled to test electrochemistry of the cathode. The cell was cycled four times at 3.0-4.3V vs. Li/Li$^+$ window with C/10 current density.
Figure 6:
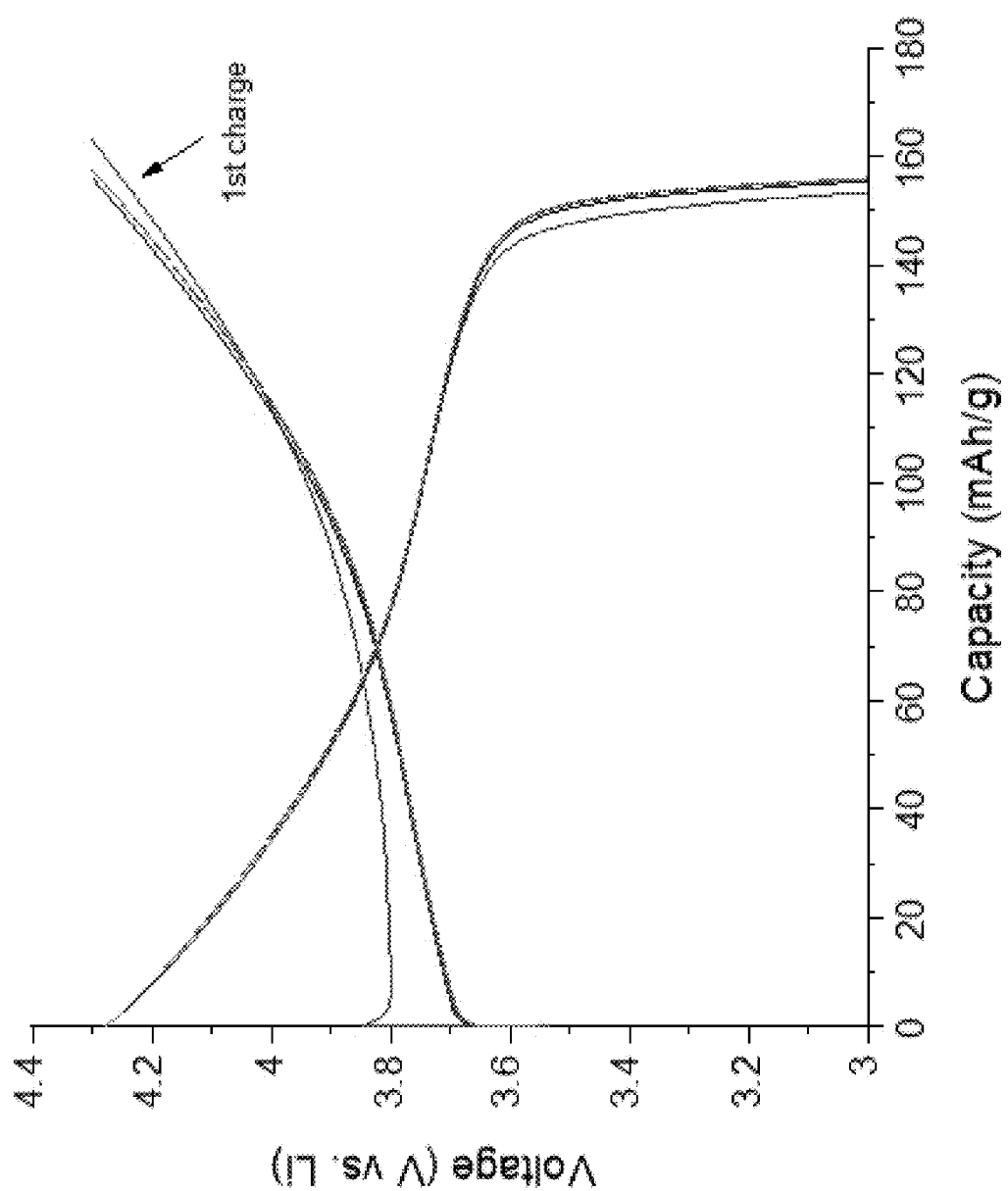
FIG. 6 depicts the charge/discharge voltage curves of the relithiated EOL cathode by the 0.5M Methyl-p-benzoquinone in DME electrolyte. The relithiation was done in a coin cell as shown in FIG. 1b. The relithiaed EOL cathode was collected and rinsed. A new coin half-cell was assembled to test electrochemistry of the cathode. The cell was cycled four times at 3.0-4.3V vs. Li/Li$^+$ window with C/10 current density.
Figure 7:
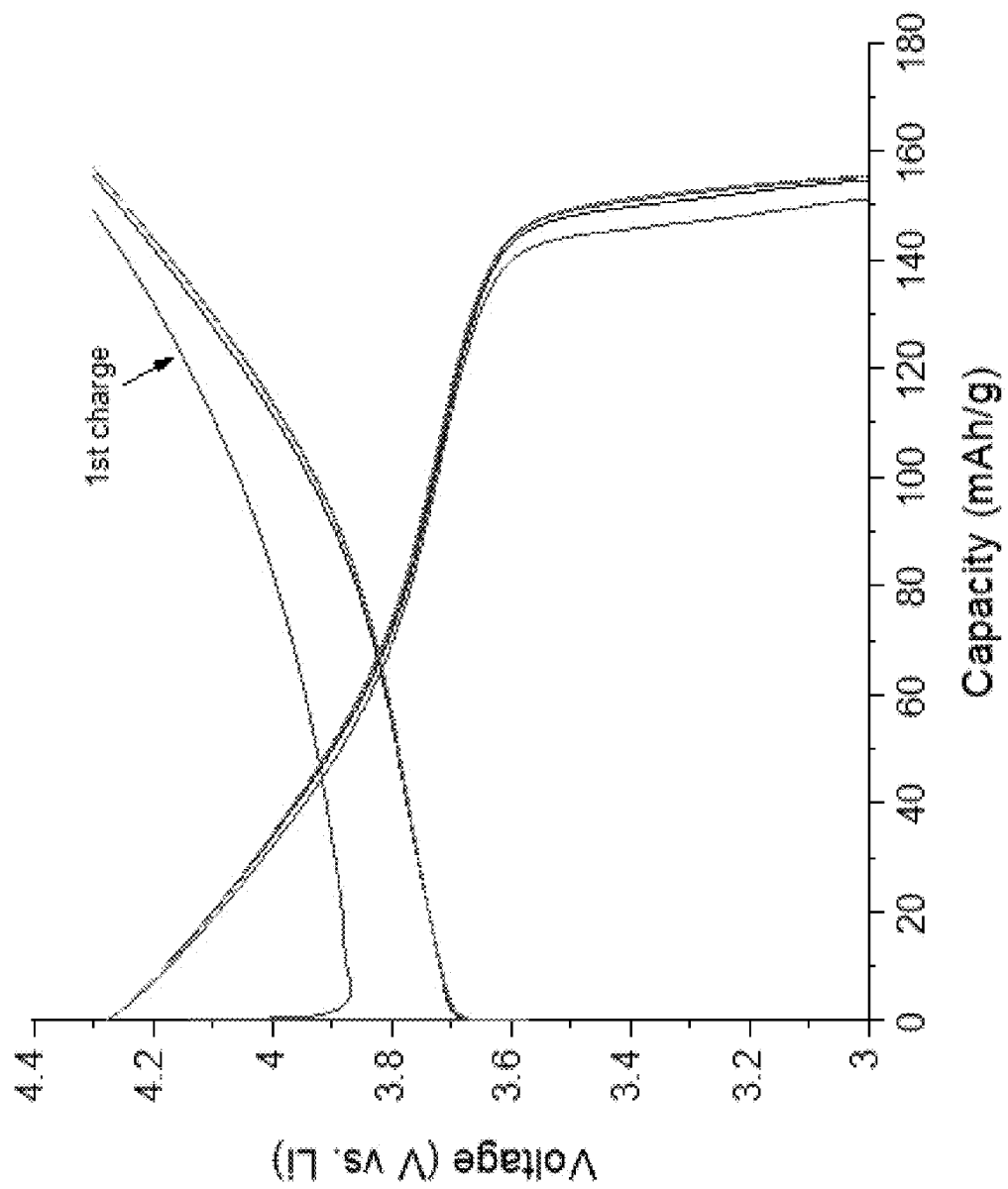
FIG. 7 depicts the charge/discharge voltage curves of the relithiated EOL cathode by the 0.5M p-Benzoquinone in DME electrolyte. The relithiation was done in a coin cell as shown in FIG. 1b. The relithiaed EOL cathode was collected and rinsed. A new coin half-cell was assembled to test electrochemistry of the cathode. The cell was cycled four times at 3.0-4.3V vs. Li/Li$^+$ window with C/10 current density.
Figure 8:
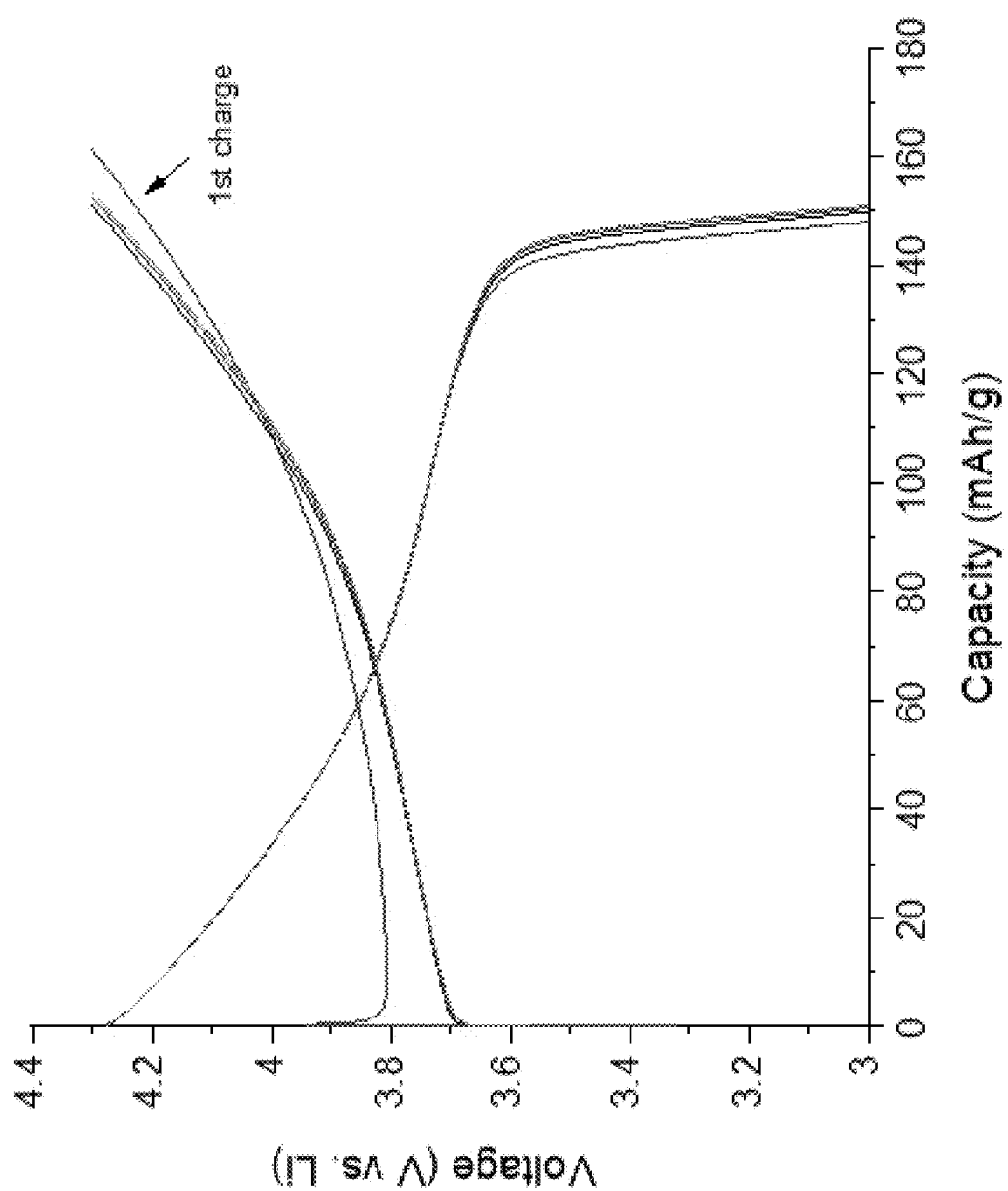
FIG. 8 depicts the charge/discharge voltage curves of the relithiated EOL cathode by the 0.5M 1,4-Naphthoquinone in DME electrolyte. The relithiation was done in a coin cell as shown in FIG. 1b. The relithiaed EOL cathode was collected and rinsed. A new coin half-cell was assembled to test electrochemistry of the cathode. The cell was cycled four times at 3.0-4.3V vs. Li/Li$^+$ window with C/10 current density.
Figure 9:
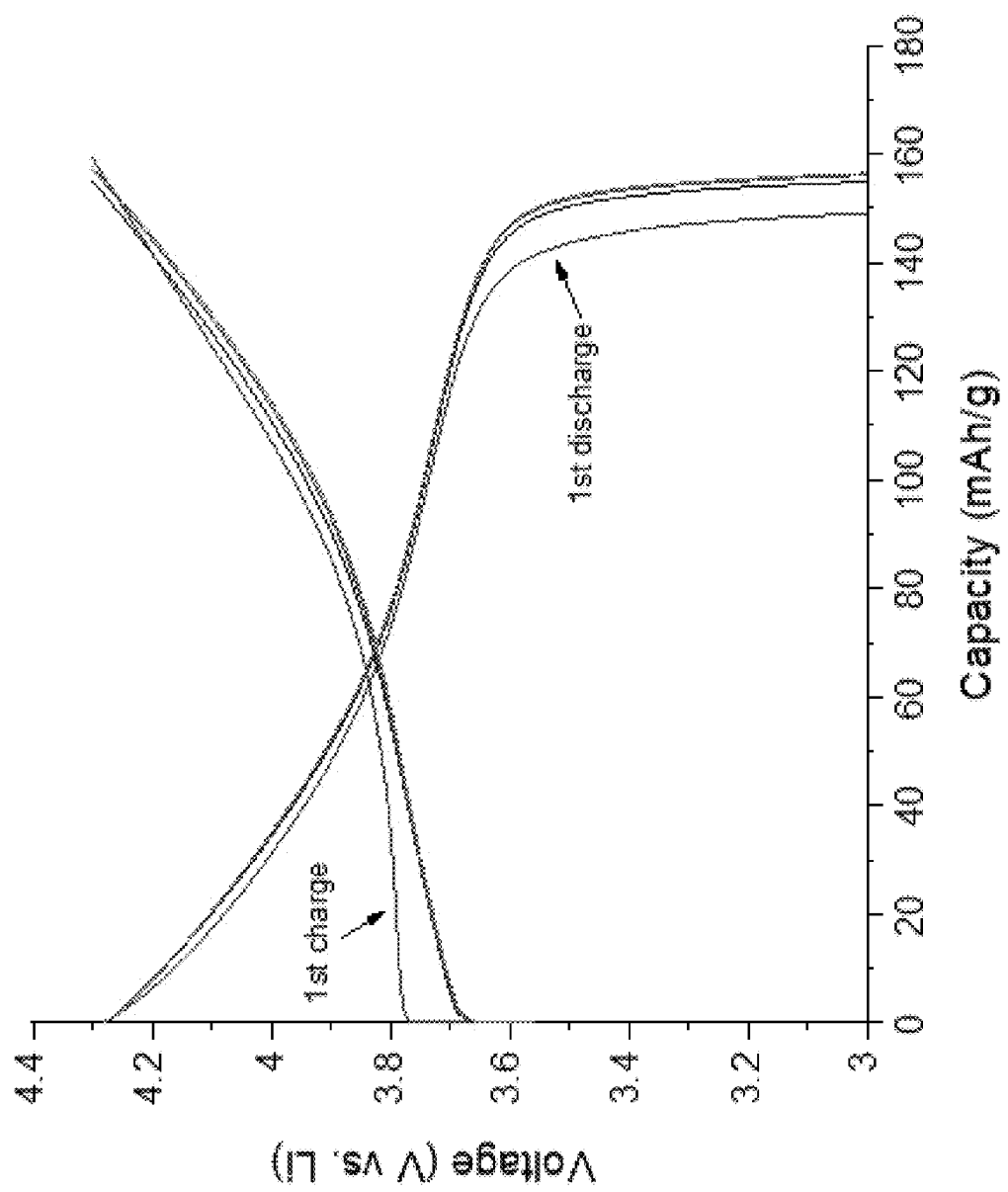
FIG. 9 depicts the charge/discharge voltage curves of the relithiated EOL cathode by the 0.5M Thymoquinone in DME electrolyte. The relithiation was done in a coin cell as shown in FIG. 1b. The relithiaed EOL cathode was collected and rinsed. A new coin half-cell was assembled to test electrochemistry of the cathode. The cell was cycled four times at 3.0-4.3V vs. Li/Li$^+$ window with C/10 current density.

The Li bag was added to the chemically reduced DTBQ electrolyte (see FIG. 5, for example) together with the EOL cathode powder for the relithiation reaction. The Celgard separator is porous enough to permeate the liquid electrolyte and also perfectly prevents crossover of the cathode powder. Li metal is light and floating on the electrolyte, which also minimize the chance of direct contact between the Li bag and the EOL cathode powder. After the relithiation reaction, the Li metal was collected and rinsed with pure DME as shown in the figure above. It exhibits corrosion that is more visible after a longer time reaction.

In another embodiment, disclosed herein are methods for recycling the lithium and other substances from end-of-life batteries by using a Soxhlet extractor. In an embodiment, samples (e.g. Cathode/PVDF) are repeatedly extracted with solvent regenerated by distillation through a periodic siphoning process through the use of a Soxhlet extractor or other distillation apparatus.

In an embodiment, the end-of-life batteries may be ground up and the solids extracted using a Soxhlet extractor and an appropriate solvent to dissolve the element/compound of interest. In an embodiment, redox mediators as disclosed herein may be used to selectively extract the lithium from the ground up battery and the lithium is isolated from the rest of the battery material by using a Soxhlet extractor or other, similar distillation apparatus. In an embodiment, a benefit of using a Soxhlet extractor in a method for the removal of PVDF from end of life batteries (and thus the isolation of lithium and other valuable chemicals) is the automated repeated extraction with high extraction yields. In addition, one can also extract lithium salts and clean the cathode surfaces.

In an embodiment, the binder (such as polyvinylidene fluoride (PVDF)) removal with Soxhlet also has a good compatibility with the redox mediator assisted lithiation process as disclosed herein.

PVDF Binder Removal with Soxhlet Extraction Process

In an embodiment, a Soxhlet extraction method is used to extract soluble species from solid samples. Samples are repeatedly extracted with solvent regenerated by distillation through a periodic siphoning process. Therefore, the amount of the solvent for dissolving PVDF from the EOL cathode can be minimized with this process. It is also beneficial to reduce energy and cost for the solvent recovery. However, there are two technical challenges to adopt the Soxhlet extraction method for the PVDF removal.

First, conventional Soxhlet process is ideal for low b.p. solvents because the distillation requires thermal energy. However, as stated above, all the available PVDF solvents have high b.p.s above 150° C. It is practically difficult to run the Soxhlet extraction process because the PVDF solvents will hardly evaporate. In an embodiment, methods disclosed herein use a vacuum for the Soxhlet extraction process in order to accelerate evaporation of the high-b.p. PVDF solvents. The Soxhlet apparatus, ideally the condenser is connected to a vacuum pump during the process. Under a reduced pressure, the evaporation and condensation of the process solvent are fast enough to have several siphoning cycles within an hour.

Second, conventional Soxhlet process does not use mechanical agitation inside the Soxhlet body during the process. The PVDF binder in the EOL cathode forms a composite with cathode active material and nano-sized carbon black. It is kinetically difficult to dissolve PVDF from the composite structure, which means many siphoning cycles are needed to dissolve PVDF. In an embodiment, methods disclosed herein use a mechanical agitation for the Soxhlet extraction process in order to accelerate the PVDF dissolution process. In an embodiment, the mechanical agitation is sonication. The Soxhlet body is sonicated via a sonotrode while the EOL cathode is immersed in a PVDF solvent, and it enhances dissolution of PVDF.

Figure 10:
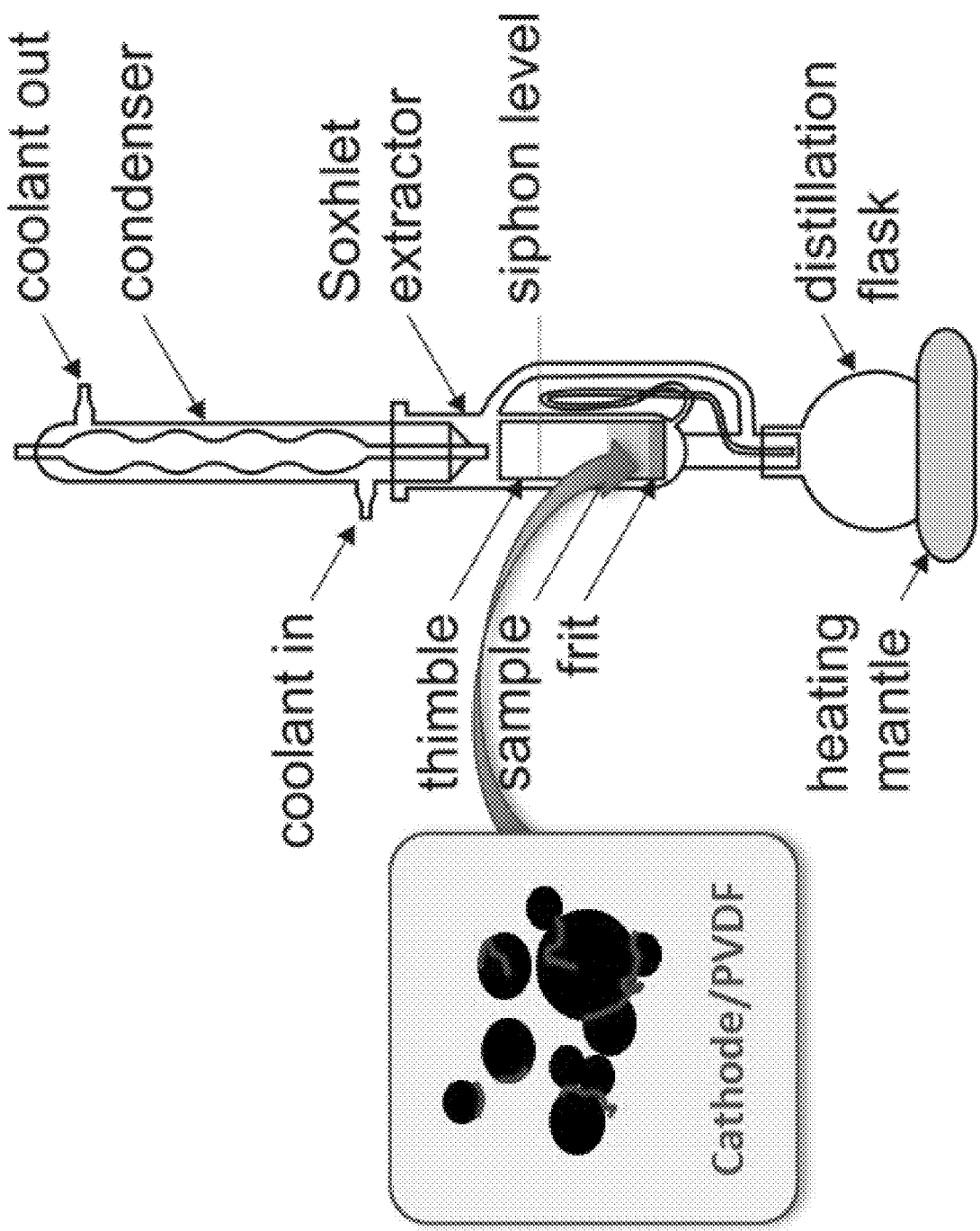
FIG. 10 depicts an embodiment wherein a Soxhlet extractor is used to remove PVDF binder during the recycling process.

In an embodiment, the components used in the method are arranged according to that depicted in FIG. 10. In an embodiment, the method uses a lab-scale Soxhlet apparatus that can be scaled up to a large-scale pilot plant. However, it will be still connected to vacuum pump and adopts mechanical agitation inside the Soxhlet body.

In an embodiment, the condenser is connected to a vacuum pump. DMF was put into the distillation flask. The b.p. of DMF is 153° C. Temperature was set to 40° C. for solvent evaporation. Vacuum is on during the process so that whole Soxhlet extraction apparatus was in a reduced pressure. This resulted in DMF evaporating, and condensation happened quickly. A higher temperature setting is not safe as the solvent starts boil. The result demonstrates that a reduced pressure is needed to run the Soxhlet extraction process with a high-b.p. PVDF solvent. However, using the above method, the cathode was not fully peeled off the current collector due to a lack of mechanical agitation. Five and ten siphon cycles did not produce any notable differences.

In an embodiment, a sonotrode was inserted into the Soxhlet body through an opening on the top. The opening is sealed so that the whole Soxhlet apparatus keeps vacuum during operation. The condenser is connected to a vacuum pump through a Schlenk line. DMF was put into the distillation flask. The b.p. of DMF is 153° C. Temperature was set to 40° C. for solvent evaporation. Vacuum is on during the process so that whole Soxhlet apparatus was in a reduced pressure. Sonication was on when the solvent level is about 70% of the siphon level until the solvent drained. The above method resulted in DMF evaporating, and condensation happened quickly at a reduced pressure. The higher temperature setting was not safe as the solvent started to boil. This result demonstrates that a reduced pressure is needed to run the Soxhlet extraction process with a high b.p. PVDF solvent.

The sonication helped dissolution of PVDF from the cathode composite. The sample thimble turned into black as cathode active material and carbon black come off the current collector. After the Soxhlet reaction, cathode powder, carbon black, and aluminum current collector were collected from the sample thimble. The solvent in the solvent container was collected for the following PVDF and solvent recovery process.

PVDF and Solvent Recovery Process Via Solvent Transfer

In an embodiment, after removing PVDF or PVDF/carbon from the EOL cathode with a solvent, it is required to recover PVDF from the solution. The recycled PVDF may be used again for the battery application or other use. The recovered solvent may be fed into the Soxhlet binder removal process again to enable a near closed-loop solvent use. A way to remove a solvent from a solution is to evaporate it using thermal energy. A reduced pressure is often required to accelerate the evaporation. In an embodiment, a conventional rotary evaporator was used to evaporate DMF solvent from 5% PVDF in DMF solution at 90° C. under vacuum. Ninety degrees Celsius is about the highest temperature setting with a water bath, this resulted in no appreciable DMF solvent in the condenser flask after 2 h of the reaction.

In an embodiment, a vacuum solvent transfer manifold was used with a liquid nitrogen ($LN_2$) trap. In an embodiment, the apparatus is composed of a solution container, a solvent trap, and a tube connecting the solvent container and the trap. A vacuum connection may be made through the transfer manifold or the solvent trap. In an embodiment, a lab-scale solvent transfer apparatus can be scaled up to a large-scale pilot plant. Liquid nitrogen has a b.p. of −196° C., and therefore it quickly condenses molecules in the vapor phase. The above apparatus and method resulted in complete removal of a solvent from a PVDF solution and PVDF was isolated. The $LN_2$ trap was useful to collect the high b.p. solvent.

In an embodiment, a cooling system that can lower the trap temperature without using $LN_2$ is used wherein the temperature of the cooling system is lower than about −18° C.

When a conventional rotary evaporator was used for solvent evaporation from 5 wt. % PVDF in DMF solution, and the temperature was set to 90° C., with vacuum on for 2 hours and the solvent trap temp was room temp, DMF did not evaporate, and condensation did not happen during the 2 h evaporation process.

In an embodiment, a solvent transfer manifold was used with a liquid nitrogen ($LN_2$) trap. In an embodiment, on one end there was a solution flask in a water bath, and on the other side, there is a $LN_2$ trap. The manifold was connected to Schlenk line for vacuum. A 5 wt. % PVDF solution in DMF (50 mL) was added to the solution flask. The water bath temperature was set at 50° C. A mild heating was required as the solvent transfer did not happen at room temperature. A higher temperature setting was not safe as the solvent starts boil under vacuum. After pumping the whole apparatus for 5 minutes, $LN_2$ was poured into the dewar flask to start trapping DMF molecules in the vapor phase. The complete evaporation took less than 30 minutes. PVDF was recovered as a film form and the recovered DMF solvent in separate containers.

Using methods disclosed herein, PVDF and carbon black solid composite are separated from a solution. For example, if the Soxhlet extraction process isolates only the EOL cathode for recycling, then the byproduct is a PVDF/carbon solution. It is doable via either filtration or a centrifuge step because the EOL cathode is much larger (typically 1~30 um) than nano-sized carbon black and much heavier. A 20 mL solution of PVDF and carbon black in DMF was obtained by dissolving PVDF from an EOL cathode and filtering the solution to separate the EOL cathode particles and PVDF/carbon. The pore size of the filter paper was 0.7 μm. To remove DMF from the solution, the same solvent transfer method was used with $LN_2$ trap. The complete evaporation took less than 30 minutes. Recovered PVDF/C and the recovered DMF solvent were isolated in separate containers. No solid contaminants were observed in the recovered DMF.

PVDF Recovery Process Via Immersion Precipitation

In an embodiment, after removing PVDF or PVDF/carbon from the EOL cathode with a solvent, PVDF or PVDF/carbon is recovered from the solution. In an embodiment, a method uses a nonsolvent to solidify PVDF or PVDF/carbon. If a PVDF solution is fed into a nonsolvent, then the PVDF solvent and nonsolvent cross diffuse to each other, and PVDF turns into a solid phase. In an embodiment, a substrate may be used for the separation where the PVDF solution is casted onto a substrate, and the substrate is immersed into the nonsolvent bath. Then the solidified PVDF can be isolated/separated from the substrate. In an embodiment, the casting and feeding into the nonsolvent bath process can be automated continuous process.

If it is not using a substrate, the PVDF or PVDF/carbon solution may be poured into a nonsolvent bath. Then a solid suspension is obtained. The solid component may be separated via filtering or centrifuge.

The nonsolvent can be water, ethanol, methanol, propanol, butanol, benzyl alcohol, aniline, cyclohexanol, 1,2-dibromoethane, ethylene glycol, ethyl lactate, formamide, formic acid, glycerol or any blend thereof, for example. In an embodiment, the solvent/nonsolvent mixture may be separated/purified via distillation in a later process.

In an embodiment, a 5 wt. % PVDF in DMF solution was poured onto a polyethylene terephthalate (PET) film. The film was immersed into a water bath and removed quickly. A solidified PVDF film was formed. The isolated film was thin and porous.

In an embodiment, a 10 wt. % PVDF in DMF solution was poured onto a PET film. The film was immersed into a water bath and removed quickly. A solidified PVDF film was formed. The film was comparatively thicker than the film from the 5 wt. % solution as disclosed above and was well-connected without pinholes.

In an embodiment, a 5 wt. % PVDF in DMF solution was poured onto a PET film. The film was immersed into an ethanol bath and removed quickly. A solidified PVDF film was formed. The film was more dispersed and thinner compared to the films formed in a water bath. In an embodiment, a portion of PVDF was precipitated in the ethanol bath and separated via filtration before reusing the DMF.

In an embodiment, a 10 wt. % PVDF in DMF solution was poured onto a PET film. The film was immersed into an ethanol bath and removed quickly. A solidified PVDF film was formed. The film was more dispersed and thinner compared to the films formed in a water bath. The film had less adhesion to the PET substrate film, so it was easier to separate the film. Some portion of PVDF was precipitated in the ethanol bath and separated via filtration before reusing the DMF. Thus, a more concentrated PVDF solution forms a thicker PVDF film both in water and ethanol bath, and the thicker films have less adhesion to the substrate.

In an embodiment, a PVDF and carbon black solution in DMF was obtained by dissolving PVDF from an EOL cathode and filtering the solution to separate the EOL cathode particles and PVDF/carbon. The pore size of the filter paper was 0.7 um. The solution was poured onto a PET film. The film was immersed into a water bath and removed quickly. A solidified PVDF/carbon film was formed. There was no appreciable PVDF and carbon contamination in the water bath, and the PVDF and carbon black was only observed on the PET substrate film.

The foregoing disclosure has been set forth merely to illustrate the invention and is not intended to be limiting.

We claim:

1. A method for recycling lithium cathode from a battery comprising contacting a lithium cathode comprising a binder with a quinone-based redox mediator wherein the method further comprises the step of a Soxhlet extraction process to remove the binder from the lithium cathode and wherein the Soxhlet extraction process comprises a condenser that is cooled to a temperature of less than negative 100° C.

2. The method of claim 1 wherein the binder is polyvinylidene fluoride (PVDF).

3. The method of claim 1 wherein the Soxhlet extraction process takes place under a vacuum.

4. The method of claim 1 wherein the binder is soluble in a solvent used in the Soxhlet extraction process.

5. The method of claim 1 further comprising mechanical agitation of the lithium cathode.

6. The method of claim 1 further comprising sonication of the lithium cathode.

7. The method of claim 1 wherein the Soxhlet extraction process comprises a condenser that is cooled to a temperature of less than negative 196° C.

8. The method of claim 1 wherein the binder is isolated from the lithium cathode.

9. The method of claim 1 wherein the redox mediator is 3,5-di-tert-butyl-o-benzoquinone.

10. The method of claim 1 wherein the redox mediator is selected from the group consisting of thymoquinone, methyl-p-benzoquinone, duroquinone, and naphthoquinone.

11. The method of claim 1 wherein the cathode is $Li[NiMnCo]_{1/3}O_2$.

12. The method of claim 1 wherein the cathode is $Li_{0.9}[NiMnCo]_{1/3}O_2$.

13. The method of claim 1 wherein the redox mediator is dissolved in an electrolyte.

14. The method of claim 13 wherein the electrolyte is dimethyl ether (DME).

15. The method of claim 1 further comprising using a cathode powder that is agitated in a redox-mediator electrolyte with the Li metal covered with a porous polypropylene membrane.

16. The method of claim 15 wherein the redox mediator is a quinone-based redox mediator.

17. The method of claim 16 wherein the redox mediator is 3,5-di-tert-butyl-o-benzoquinone.

18. The method of claim 16 wherein the redox mediator is selected from the group consisting of thymoquinone, methyl-p-benzoquinone, duroquinone, and naphthoquinone.

* * * * *